United States Patent
Zhang et al.

(10) Patent No.: US 12,542,920 B2
(45) Date of Patent: Feb. 3, 2026

(54) MONITORING VIDEO COMPRESSION METHOD, MONITORING SYSTEM, COMPUTER DEVICE AND MEDIUM

(71) Applicant: SUZHOU METABRAIN INTELLIGENT TECHNOLOGY CO., LTD., Jiangsu (CN)

(72) Inventors: Zhenlei Zhang, Jiangsu (CN); Tuo Li, Jiangsu (CN); Hongtao Man, Jiangsu (CN); Tongqiang Liu, Jiangsu (CN); Yulong Zhou, Jiangsu (CN); Xiaofeng Zou, Jiangsu (CN); Xiankun Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 226 days.

(21) Appl. No.: 18/571,671

(22) PCT Filed: May 26, 2022

(86) PCT No.: PCT/CN2022/095384
§ 371 (c)(1),
(2) Date: Dec. 18, 2023

(87) PCT Pub. No.: WO2023/109017
PCT Pub. Date: Jun. 22, 2023

(65) Prior Publication Data
US 2024/0292008 A1    Aug. 29, 2024

(30) Foreign Application Priority Data
Dec. 15, 2021    (CN) .......................... 202111526963.1

(51) Int. Cl.
*H04N 19/42* (2014.01)
*G05B 15/02* (2006.01)

(52) U.S. Cl.
CPC ............. *H04N 19/42* (2014.11); *G05B 15/02* (2013.01)

(58) Field of Classification Search
CPC .............................. G05B 15/02; H04N 19/42
(Continued)

(56) References Cited

U.S. PATENT DOCUMENTS

| 5,351,129 A | * | 9/1994 | Lai ........................ H04N 7/24 348/E5.053 |
| 6,510,283 B1 | * | 1/2003 | Yamagishi ............. H04N 23/68 348/208.99 |

(Continued)

FOREIGN PATENT DOCUMENTS

| CN | 201118848 Y | 9/2008 |
| CN | 102148961 A | 8/2011 |

(Continued)

OTHER PUBLICATIONS

Corresponding International Patent Application No. PCT/CN2022/095384, International Search Report, Date Mailed Sep. 7, 2022.
(Continued)

*Primary Examiner* — Joseph G Ustaris
*Assistant Examiner* — Jimmy S Lee
(74) *Attorney, Agent, or Firm* — Cooper Legal Group, LLC

(57) ABSTRACT

A monitoring video compression method, a monitoring system, a computer device, and a medium. The method includes: a monitoring center configuring a key monitoring point and sending configuration information of the key monitoring point to a video server through a management center; the video server receiving the configuration information of the key monitoring point, selecting a corresponding video source based on the configuration information of the key monitoring point, transferring the corresponding
(Continued)

video source from a video compression module to a baseboard management controller (BMC) for compression, and writing the corresponding video source into a storage space of the video server after the compression is completed.

17 Claims, 3 Drawing Sheets

(58) Field of Classification Search
USPC .................................................... 375/240.26
See application file for complete search history.

(56) References Cited

U.S. PATENT DOCUMENTS

| | | | |
|---|---|---|---|
| 10,116,904 B2 | 10/2018 | Addy | |
| 2005/0226463 A1* | 10/2005 | Suzuki | G08B 13/19656 |
| | | | 382/103 |
| 2009/0015671 A1* | 1/2009 | Addy | H04N 21/4334 |
| | | | 348/143 |
| 2010/0097470 A1* | 4/2010 | Yoshida | H04N 19/132 |
| | | | 375/E7.076 |
| 2010/0329358 A1* | 12/2010 | Zhang | H04N 19/187 |
| | | | 375/E7.02 |
| 2011/0222687 A1* | 9/2011 | Mori | H04N 7/1675 |
| | | | 380/200 |
| 2016/0012380 A1* | 1/2016 | Sugiyama | G06F 3/0485 |
| | | | 705/7.15 |
| 2019/0320117 A1 | 10/2019 | Wu et al. | |
| 2022/0247919 A1* | 8/2022 | O'Leary | H04N 5/2628 |

FOREIGN PATENT DOCUMENTS

| | | |
|---|---|---|
| CN | 103067529 A | 4/2013 |
| CN | 103475856 A | 12/2013 |
| CN | 107257474 A | 10/2017 |
| CN | 113079379 A | 7/2021 |
| CN | 113709489 A | 11/2021 |
| CN | 113923421 A | 1/2022 |
| JP | 2008072636 A | 3/2008 |
| JP | 2010213119 A | 9/2010 |

OTHER PUBLICATIONS

Corresponding International Patent Application No. PCT/CN2022/095384, Written Opinion, Date Mailed Sep. 7, 2022.
Corresponding Chinese Patent Application No. CN202111526963.1, First Office Action dated Jan. 18, 2022.

* cited by examiner

MONITORING VIDEO COMPRESSION METHOD, MONITORING SYSTEM, COMPUTER DEVICE AND MEDIUM

CROSS-REFERENCE TO RELATED APPLICATION

This application is the national phase application of International Application No. PCT/CN2022/095384, filed May 26, 2022, which claims priority to Chinese Patent Application No. 202111526963.1, filed on Dec. 15, 2021 in China National Intellectual Property Administration and entitled "MONITORING VIDEO COMPRESSION METHOD, MONITORING SYSTEM, COMPUTER DEVICE, AND MEDIUM". The contents of International Application No. PCT/CN2022/095384 and Chinese Patent Application No. 202111526963.1 are incorporated herein by reference in their entireties.

FIELD

The present application relates to a monitoring video compression method, a monitoring system, a computer device, and a medium.

BACKGROUND

Components of a video monitoring system include a monitoring front end, a management center, a monitoring center, a personal computer (PC) client, and a wireless bridge. As shown in FIG. 1, it is a schematic structural diagram of a video monitoring system. The components of the monitoring system are described as follows.

Monitoring front end: configured to collect monitoring information of monitored points and able to be equipped with an alarm device. The monitoring front end mainly has the following two implementations.
  1) General camera+video server. The general camera may be an analog camera or a digital camera. An original video signal is transmitted to the video server, encoded by the video server, and transmitted to other devices through a network by transmission control protocol (TCP)/Internet protocol (IP).
  2) Network camera. The network camera is an advanced camera device integrated with photography, video coding, and Web (network) services, which is embedded with TCP/IP protocol stacks and may be directly connected to the network.

Management center: responsible for the management, control, alarm processing, video, video playback, and user management of all front-end devices. Each part of the functions is performed by a dedicated server.

Monitoring center: configured to centrally monitor an area under administration, including a television wall and a monitoring client terminal group. The monitoring system may include one or more monitoring centers.

PC client: outside the monitoring center. The monitoring system may also connect the PC to the management center for remote monitoring.

If the monitoring system adopts the general camera+video server for monitoring, an inputted video is encoded in the video server. Actually, multi-channel original video data transmitted from the camera is compressed using compression software running on the video server or a dedicated video compression chip. However, there is no way to distinguish the timely and rapid compression of monitoring information of a key point. Meanwhile, there is no way to ensure that the key point may be configured to switch, for example, a camera input of a monitoring point that a monitor currently wishes to view is taken as a key input point for fast and focused compression processing, whereby the monitor may make a timely determination. If the monitoring system adopts the network camera for monitoring, types and styles of network cameras are limited, and the selectivity is far less than that of the general camera+video server.

The above two monitoring methods have their own advantages and disadvantages. A resolution of the network camera is D1 (704×576), and the monitoring effect is excellent. The video server itself is camera-free, but it is flexible enough to receive inputs from any analog/digital general camera. A multi-channel video server may receive multiple cameras. A compression resolution of a single-channel video server is D1 (704×576). A compression resolution of a dual-channel video server is Half D1 (704×288). A compression resolution of a four-channel video server is CIF (352×288). Therefore, when choosing the monitoring method, it is necessary to consider not only the function and effect, but also the convenience and cost. Therefore, the monitoring method using the general camera+video server and the monitoring method using the network camera coexist for a long time.

The present application is an improvement for a monitoring scene of the general camera+video server.

The monitoring scene of the general camera+video server includes many cameras, that is to say, the video server has many channels of original video inputs. In the video server, multi-channel inputted video data are compressed using dedicated compression software or the dedicated video compression chip. The inventors realized that whether using the compression software/compression chip, many channels of video inputs are compressed together, and thus the compression efficiency and timeliness are generally poor, that is to say, the video information seen by the monitor is actually a long delay from the time when the monitoring point occurred. At this time, if there is an emergency, such as the monitoring of high-risk places in factory buildings and hospitals, or the monitoring of the public security department for arresting criminals, measures will be taken earlier if the monitoring personnel see the information of the emergency monitoring point earlier, or if alarm information is generated earlier.

SUMMARY

According to various embodiments disclosed in the present application, an aspect of the embodiments of the present application provides a monitoring video compression method, being applied to a monitoring system. The monitoring system includes a monitoring device, a video server, a management center, and a monitoring center. The method in some embodiments includes the following steps:

the monitoring center configuring a key monitoring point and sending configuration information of the key monitoring point to the video server through the management center; and the video server receiving the configuration information of the key monitoring point, selecting a corresponding video source based on the configuration information of the key monitoring point, transferring the corresponding video source from a video compression module to a baseboard management controller (BMC) for compression, and writing the corresponding video source into a storage space of the video server after the compression is completed.

In one or more embodiments, the monitoring center configuring a key monitoring point and sending configuration information of the key monitoring point to the video server through the management center includes:

the monitoring center acquiring all the monitoring devices connected to the monitoring system and setting a serial number for the monitoring devices; and acquiring a serial number of a corresponding monitoring device of the key monitoring point and sending the serial number of the corresponding monitoring device to the video server through the management center.

In one or more embodiments, selecting a corresponding video source based on the configuration information of the key monitoring point includes:

acquiring the serial number of the corresponding monitoring device from the configuration information of the key monitoring point; and selecting the corresponding video source according to the serial number of the corresponding monitoring device.

In one or more embodiments, the method further includes:

the monitoring center configuring whether to enable a key monitoring point compression function of the BMC, and in response to enabling the key monitoring point compression function of the BMC, sending corresponding BMC configuration information to the video server through the management center; and the video server receiving the BMC configuration information and configuring the BMC based on the BMC configuration information to cause the BMC to compress a video source of the key monitoring point.

In one or more embodiments, the method further includes:

the video server reading a compressed video source of the key monitoring point from the storage space and sending the compressed video source of the key monitoring point to the monitoring center through the management center.

In one or more embodiments, the video server reading a compressed video source of the key monitoring point from the storage space includes:

a network module of the video server invoking a network card driver to read the compressed video source of the key monitoring point from the storage space.

In one or more embodiments, writing the corresponding video source into a storage space of the video server after the compression is completed includes:

writing a compressed corresponding video source into a corresponding storage area of the storage space and setting a reading priority of the corresponding storage area to be high.

In one or more embodiments, the monitoring center configures whether to enable a key monitoring point compression function of the BMC. In response to enabling the key monitoring point compression function of the BMC, a video compression function of the BMC is switched from a function of compressing an operating system interface to a function of compressing a key monitoring point video without affecting other functions of the BMC; and in response to not enabling the key monitoring point compression function of the BMC, an original function of compressing the operating system interface is performed on the BMC for a remote client to monitor and view a running state of a local server.

In another aspect of the embodiments of the present application, a monitoring system is also provided. The monitoring system includes a monitoring device, a video server, a management center, and a monitoring center. The monitoring center is configured to configure a key monitoring point and send configuration information of the key monitoring point to the video server through the management center. The video server is configured to receive the configuration information of the key monitoring point, select a corresponding video source based on the configuration information of the key monitoring point, transfer the corresponding video source from a video compression module to a BMC for compression, and write the corresponding video source into a storage space of the video server after the compression is completed.

In a further aspect of the embodiments of the present application, a computer device is also provided, including a memory and one or more processors. The memory has stored therein computer-readable instructions, and the computer-readable instructions, when executed by the one or more processors, cause the one or more processors to perform the steps of the monitoring video compression method as described above.

In yet another aspect of the embodiments of the present application, one or more non-transitory computer-readable storage media storing computer-readable instructions are also provided. The computer-readable instructions, when executed by one or more processors, cause the one or more processors to perform the steps of the monitoring video compression method as described above.

Details of one or more embodiments of the present application are set forth in the accompanying drawings and the description below. Other features and advantages of the present application will become apparent from the description, accompanying drawings, and claims.

BRIEF DESCRIPTION OF THE DRAWINGS

In order to describe technical solutions in the embodiments of the present application or the related art more clearly, drawings required to be used in the descriptions of embodiments or related art will be briefly introduced below. Apparently, the drawings described below are merely some embodiments of the present application. For a person skilled in the art, other embodiments may also be obtained based on these drawings without creative effort.

DETAILED DESCRIPTION

In order to make the purpose, technical solutions, and advantages of the present application clearer and more understandable, the embodiments of the present application are further described in detail below in conjunction with specific embodiments and with reference to the accompanying drawings.

It should be noted that all expressions using "first" and "second" in the embodiments of the present application are for distinguishing two items with the same names but different entities or parameters. It might be seen that "first" and "second" are merely for the convenience of expressions and should not be understood as limiting the embodiments of the present application, and subsequent embodiments will not be described one by one.

Figure 1:
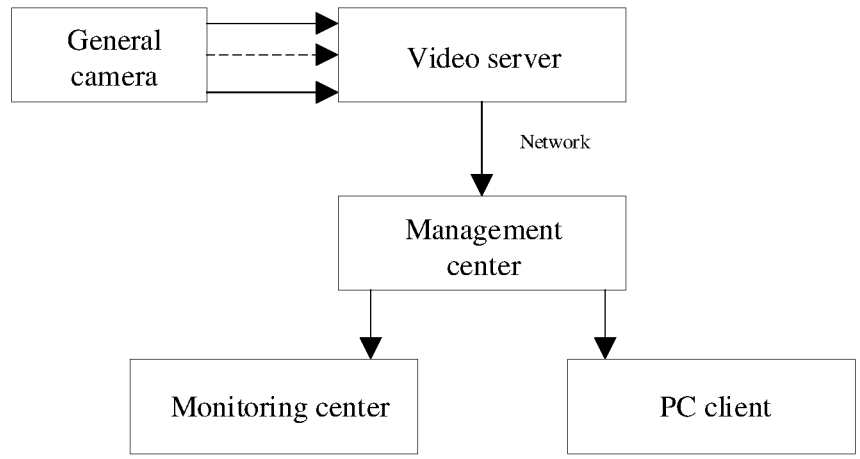
FIG. 1 is a schematic structural diagram of a conventional monitoring system.
Figure 2:
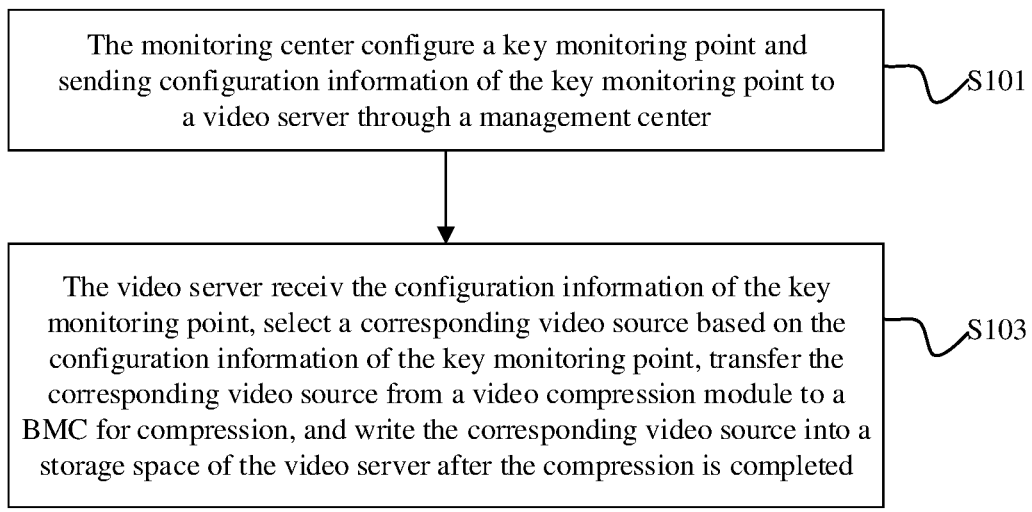
FIG. 2 is a block diagram of one or more embodiments of a monitoring video compression method according to the present application.

Based on the above-mentioned purpose, a first aspect of the embodiments of the present application proposes an embodiment of a monitoring video compression method. The method is applied to a monitoring system. The monitoring system includes a monitoring device, a video server, a management center, and a monitoring center. As shown in FIG. 2, the method in some embodiments includes the following steps.

At S101, the monitoring center configures a key monitoring point and sends configuration information of the key monitoring point to the video server through the management center.

At S103, the video server receives the configuration information of the key monitoring point, selects a corresponding video source based on the configuration information of the key monitoring point, transfers the corresponding video source from a video compression module to a BMC for compression, and writes the corresponding video source into a storage space of the video server after the compression is completed.

The key monitoring point is configured in the following two methods.

First, according to a specific application scene of the monitoring system, for example, monitoring information of a high-risk area of a factory building, the monitoring information is important and needs to be known by monitoring personnel for the first time. Correspondingly, a monitoring device corresponding to the high-risk area of the factory building is set as the key monitoring point, where the monitoring device is an analog camera or a digital camera.

Second, flexible settings are performed in the application scene, for example, if the monitoring personnel wish to view information of a monitoring area, a monitoring device corresponding to monitoring area is set as the key monitoring point.

In the field of servers, states (temperature, fan, main CPU operation condition, etc.) of the server are generally monitored using the BMC. Meanwhile, the BMC has an important function, namely, compressing video information of an operating system interface of a local server and transmitting same to a remote client through a network for the remote client to display and monitor.

In the embodiment, the monitoring center configures the key monitoring point and sends the configuration information of the key monitoring point to the video server through the management center. The video server receives the configuration information of the key monitoring point, selects the corresponding input video source based on the configuration information of the key monitoring point, and compresses the video source of the key monitoring point based on the BMC.

Furthermore, before compressing the video source of the key monitoring point, the BMC first determines whether it executes a request for viewing the operating system interface sent by the remote client. In response to executing the request, the BMC waits for the request to be executed completely and then compresses the video source of the key monitoring point after returning the video information to the remote client. In response to not executing the request, the BMC directly compresses the video source of the key monitoring point.

By the above-mentioned method, the video sources inputted from the monitoring device are not compressed uniformly by the video compression module. By configuring the key monitoring point, a video inputted by the key monitoring point is transferred to the BMC for compression, improving the compression efficiency of the video server for the video source inputted by the key monitoring point and shortening the time for the video source inputted by the key monitoring point to be transmitted from the video server to the monitoring center. Thus, the monitoring personnel may see a monitored picture faster and more timely.

In one or more embodiments, the monitoring center configuring a key monitoring point and sending configuration information of the key monitoring point to the video server through the management center includes:
 the monitoring center acquiring all the monitoring devices connected to the monitoring system and setting a serial number for the monitoring devices; and
 acquiring a serial number of a corresponding monitoring device of the key monitoring point and sending the serial number of the corresponding monitoring device to the video server through the management center.

In one or more embodiments, selecting a corresponding video source based on the configuration information of the key monitoring point includes:
 acquiring the serial number of the corresponding monitoring device from the configuration information of the key monitoring point; and
 selecting the corresponding video source according to the serial number of the corresponding monitoring device.

According to multiple embodiments of the present application, a configuration for the key monitoring point is added in the monitoring center, that is to say, according to an area where the monitoring personnel are more concerned, a monitoring device corresponding to the area is set as the key monitoring point. Identification of the configuration information of the key monitoring point transmitted by the monitoring center through the management center is increased in the video server to obtain the information of the key monitoring point. The specific configuration process is as follows.

Firstly, all cameras, such as N cameras, contained in the current monitoring system are acquired, and each camera is numbered sequentially. A serial number of the key monitoring point is acquired, such as 3, (3<N), and the serial number of the key monitoring point is transmitted back to the video server through the management center and the network. After acquiring the serial number of the key monitoring point, the video server selects video input information of a corresponding key monitoring point from a plurality of video source input interfaces of the video server, and then the video input information being compressed by the original transmitting to the video compression module is transferred to compressed through the BMC. The BMC compresses video information of the key monitoring point and writes the compressed data into a storage space corresponding to a network module of the video server, where the network module may be a network card.

In one or more embodiments, the method further includes:
 the monitoring center configuring whether to enable a key monitoring point compression function of the BMC, and in response to enabling the key monitoring point compression function of the BMC, sending corresponding BMC configuration information to the video server through the management center; and
 the video server receiving the BMC configuration information and configuring the BMC based on the BMC configuration information to cause the BMC to compress a video source of the key monitoring point.

The BMC itself has a video compression function, and the BMC may compress the video information of the operating system interface of the local server and transmit same to the remote client through the network for the remote client to display and monitor the running state of the operating system of the local server.

A configuration of whether to enable the key monitoring point compression function of the BMC is added to the monitoring center. When a picture of the key monitoring point needs to be viewed, the key monitoring point compression function of the BMC is set to be enabled, and the BMC is switched from a function of compressing the operating system interface to a function of compressing a key monitoring point video. When the picture of the key monitoring point does not need to be viewed, the key monitoring point compression function of the BMC is set not to be enabled, and the BMC performs an original function of compressing the operating system interface for remote client monitoring and viewing the running state of the local server, realizing the multiplexing of the BMC. It further improves the compression efficiency of the video server for the video source inputted by the key monitoring point, and shortens the transmission time of the key monitoring point video source from the video server to the monitoring center.

In one or more embodiments, the method further includes:
the video server reading a compressed video source of the key monitoring point from the storage space and sending the compressed video source of the key monitoring point to the monitoring center through the management center.

In one or more embodiments, the video server reading a compressed video source of the key monitoring point from the storage space includes:
a network module of the video server invoking a network card driver to read the compressed video source of the key monitoring point from the storage space.

In one or more embodiments, writing the corresponding video source into a storage space of the video server after the compression is completed includes:
writing a compressed corresponding video source into a corresponding storage area of the storage space and setting a reading priority of the corresponding storage area to be high.

In some embodiments, the compressed video source of the key monitoring point is written into the corresponding storage area of the storage space. The storage area is configured to separately store the compressed video source of the key monitoring point, and the reading priority of the storage area is set to be high.

In the embodiment, the compressed video source of the key monitoring point is separately stored and not together with a compressed video source of a non-key monitoring point. Therefore, the network module preferentially reads the compressed video source of the key monitoring point when reading the compressed video source through the network card driver, improving the transmission speed of the compressed video source of the key monitoring point.

It should be understood that although the steps in the flowchart of FIG. 2 are shown sequentially as indicated by the arrows, the steps are not necessarily performed sequentially in the order indicated by the arrows. Unless explicitly stated herein, there is no strict order in which these steps are performed, and these steps may be performed in other orders. Moreover, at least a portion of the steps in FIG. 2 may include multiple sub-steps or multiple stages that are not necessarily performed at the same time, but may be performed at different times. The sub-steps or stages are not necessarily performed sequentially, but may be performed in turn or in alternation with at least a portion of other steps or the sub-steps or stages of other steps.

Figure 3:
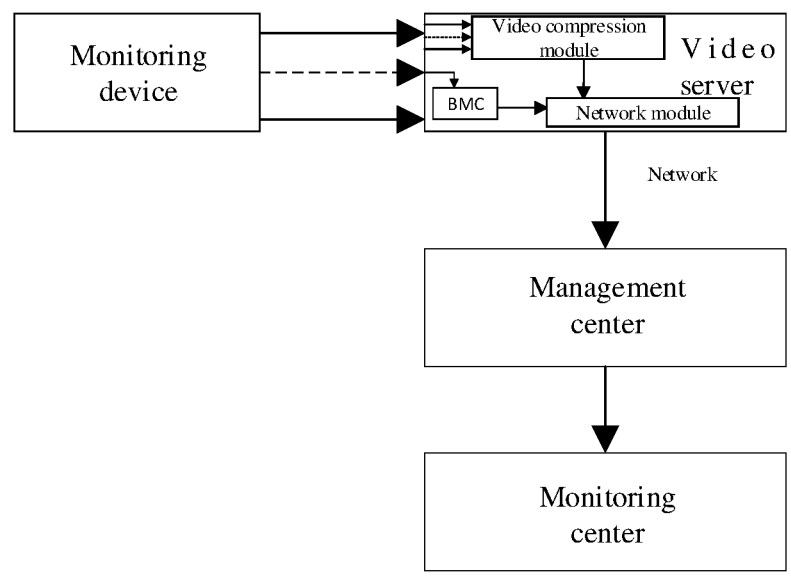
FIG. 3 is a schematic structural diagram of one or more embodiments of a monitoring system according to the present application.

Based on the same inventive concept, according to another aspect of the present application, as shown in FIG. 3, the embodiments of the present application also provide a monitoring system. The monitoring system includes a monitoring device 110, a video server 120, a management center 130, and a monitoring center 140. The monitoring center 140 is configured to configure the key monitoring point and send the configuration information of the key monitoring point to the video server 120 through the management center 130. The video server 120 is configured to receive the configuration information of the key monitoring point, select the corresponding video source based on the configuration information of the key monitoring point, transfer the corresponding video source from the video compression module to the BMC for compression, and write the corresponding video source into the storage space of the video server after the compression is completed.

In the embodiment, the monitoring center configures the key monitoring point and sends the configuration information of the key monitoring point to the video server through the management center. The video server receives the configuration information of the key monitoring point, selects the corresponding input video source based on the configuration information of the key monitoring point, and compresses the video source of the key monitoring point based on the BMC. By the above-mentioned method, the monitoring system does not compress the video sources inputted from the monitoring device uniformly by the video compression module but compresses the video source inputted by the key monitoring point through the BMC by configuring the key monitoring point, improving the compression efficiency of the video server for the video source inputted by the key monitoring point and shortening the time for the video source inputted by the key monitoring point to be transmitted from the video server to the monitoring center. Thus, the monitoring personnel may see the monitored picture faster and more timely.

In one or more embodiments, the monitoring center 140 is further configured to acquire all the monitoring devices connected to the monitoring system and setting the serial number for the monitoring devices; and
acquire the serial number of the corresponding monitoring device of the key monitoring point and send the serial number of the corresponding monitoring device to the video server through the management center.

In one or more embodiments, the video server 120 is configured to acquire the serial number of the corresponding monitoring device from the configuration information of the key monitoring point; and select the corresponding video source according to the serial number of the corresponding monitoring device.

In one or more embodiments, the monitoring center 140 is configured to configure whether to enable the key monitoring point compression function of the BMC, and in response to enabling the key monitoring point compression function of the BMC, send the corresponding BMC configuration information to the video server through the management center. The video server 120 is configured to receive the BMC configuration information and configure the BMC based on the BMC configuration information to cause the BMC to compress the video source of the key monitoring point.

In one or more embodiments, the video server 120 is further configured to read the compressed video source of the key monitoring point from the storage space and send the compressed video source of the key monitoring point to the monitoring center through the management center.

In one or more embodiments, the video server 120 is further configured such that the network module of the video server invoking the network card driver to read the compressed video source of the key monitoring point from the storage space.

In one or more embodiments, the video server 120 is further configured to write the compressed corresponding video source into the corresponding storage area of the storage space and set the reading priority of the corresponding storage area to be high.

In one or more embodiments, the monitoring center 140 is configured to configure whether to enable the key monitoring point compression function of the BMC. In response to enabling the key monitoring point compression function of the BMC, the video compression function of the BMC is switched from the function of compressing the operating system interface to the function of compressing the key monitoring point video without affecting other functions of the BMC; and in response to not enabling the key monitoring point compression function of the BMC, the original function of compressing the operating system interface is performed on the BMC for remote client monitoring and viewing the running state of the local server.

Figure 4:
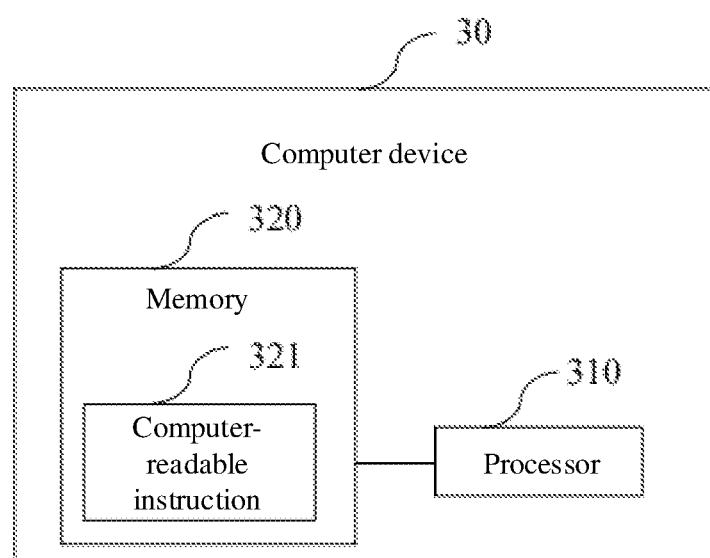
FIG. 4 is a schematic structural diagram of one or more embodiments of a computer device according to the present application.

Based on the same inventive concept, according to another aspect of the present application, as shown in FIG. 4, the embodiments of the present application also provide a computer device 30, including one or more processors 310 and a memory 320. The memory 320 stores computer-readable instructions 321 that might be run on the processors, and the one or more processors 310 execute the instructions to perform the steps of the monitoring video compression method as described above.

Figure 5:
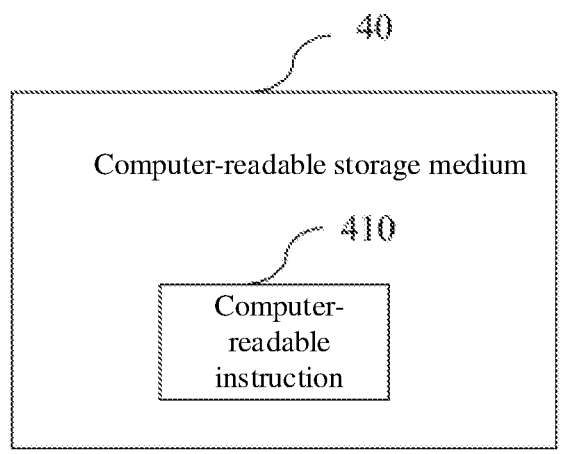
FIG. 5 is a schematic structural diagram of one or more embodiments of a computer-readable storage medium according to the present application.

Based on the same inventive concept, according to another aspect of the present application, as shown in FIG. 5, the embodiments of the present application also provide one or more non-transitory computer-readable storage media 40 storing computer-readable instructions 410. When executed by the processor, the computer-readable instructions 410 perform the steps of the monitoring video compression method as described above.

Finally, it should be noted that a person skilled in the art would understand that all or a portion of the processes implementing the above-mentioned embodiment methods may be performed by instructing associated hardware through computer-readable instructions. The computer-readable instructions may be stored on a computer-readable storage medium, which when executed, may implement the steps of the embodiments of the methods described above. The storage medium of the computer-readable instructions may be a magnetic disk, an optical disk, a read-only memory (ROM), a random access memory (RAM), etc. Embodiments of the above-mentioned computer-readable instructions may achieve the same or similar effects as any of the foregoing method embodiments to which they correspond.

A person skilled in the art would further understand that the various illustrative logical blocks, modules, circuits, and algorithm steps described in connection with the disclosure herein may be implemented as electronic hardware, computer software, or combinations of both. To clearly illustrate such interchangeability of hardware and software, functions of various illustrative components, blocks, modules, circuits, and steps have been generally described. Whether this function is implemented as software or hardware depends on the specific application and the design constraints imposed on the overall system. A person skilled in the art may implement the functions in varying ways for each specific application, but such implementation decisions shall not be construed as resulting in a departure from the scope of the disclosure of the embodiments of the present application.

The above are exemplary embodiments disclosed by the present application, but it should be noted that a variety of changes and modifications may be made without deviating from the scope of the disclosure of the embodiments of the present application limited by the claims. The functions, steps, and/or actions of the method claims according to the disclosed embodiments described herein need not be performed in any particular order. Furthermore, although elements disclosed in the embodiments of the present application may be described or claimed in individual form, they may also be understood as plurality unless expressly limited to the singular.

It should be understood that, as used herein, the singular form "a" is intended to include the plural forms as well, unless the context clearly supports the exception. It should also be understood that "and/or" used herein refers to any and all possible combinations that include one or more of the items listed in association.

The above-mentioned embodiments of the present application disclose the serial numbers of the embodiments for the purpose of description only, and do not represent the advantages and disadvantages of the embodiments.

A person skilled in the art will understand that all or a portion of the steps implementing the above-mentioned embodiments may be performed by hardware, or may be performed by instructing associated hardware through a program. The program may be stored on a computer-readable storage medium, such as the ROM, the magnetic disk, or the optical disk.

A person skilled in the art will understand that the above discussion of any embodiments is exemplary only and is not intended to suggest that the scope of the disclosure of the embodiments of the present application, including the claims, is limited to these examples. The technical features in the above embodiments or in different embodiments may also be combined within the contemplation of the embodiments of the present application, and many other variations of different aspects of the embodiments of the present application as described above exist, which are not provided in detail for the sake of clarity. Therefore, any omission, modification, equivalent replacement, improvement, etc., made within the spirit and principles of the embodiments of the present application shall be included in the scope of the embodiments of the present application.

What is claimed is:

1. A monitoring video compression method, being applied to a monitoring system, the monitoring system comprising a monitoring device, a video server, a management center, and a monitoring center, and the method comprising:

configuring, by the monitoring center, a key monitoring point and sending configuration information of the key monitoring point to the video server through the management center; and receiving, by the video server, the configuration information of the key monitoring point, selecting a corresponding video source according to the configuration information of the key monitoring point, transferring the corresponding video source from a video compression module to a baseboard management controller (BMC) for compression, and writing the corresponding video source into a storage space of the video server after the compression is completed;

configuring, by the monitoring center, whether to enable a key monitoring point compression function of the BMC, in response to enabling the key monitoring point compression function of the BMC, switching a video compression function of the BMC from a function of compressing an operating system interface to a function of compressing a key monitoring point video without affecting other functions of the BMC; and in response to not enabling the key monitoring point compression function of the BMC, performing a function of compressing the operating system interface on the BMC for a remote client to monitor and view a running state of a local server;

wherein before compressing the corresponding video source of the key monitoring point, the method further comprises:

determining whether the BMC executes a request for viewing the operating system interface sent by the remote client;

in response to the BMC executing the request, after the BMC completes the request and returns video information corresponding to the request to the remote client, enabling the BMC to compress the corresponding video source of the key monitoring point; and in response to the BMC not executing the request, enabling the BMC to compress the corresponding video source of the key monitoring point directly.

2. The method according to claim 1, wherein the configuring, by the monitoring center, a key monitoring point and sending configuration information of the key monitoring point to the video server through the management center comprises:

acquiring, by the monitoring center, a plurality of monitoring devices connected to the monitoring system and setting a serial number for each of the plurality of monitoring devices; and acquiring a serial number of a corresponding monitoring device of the key monitoring point and sending the serial number of the corresponding monitoring device to the video server through the management center.

3. The method according to claim 2, wherein the selecting a corresponding video source according to the configuration information of the key monitoring point comprises:

acquiring the serial number of the corresponding monitoring device from the configuration information of the key monitoring point; and selecting the corresponding video source according to the serial number of the corresponding monitoring device.

4. The method according to claim 1, further comprising:

in response to enabling the key monitoring point compression function of the BMC, sending corresponding BMC configuration information to the video server through the management center; and receiving, by the video server, the corresponding BMC configuration information and configuring the BMC according to the corresponding BMC configuration information to enable the BMC to compress the corresponding video source of the key monitoring point.

5. The method according to claim 1, further comprising:

reading, by the video server, a compressed video source of the key monitoring point from the storage space and sending the compressed video source of the key monitoring point to the monitoring center through the management center.

6. The method according to claim 5, wherein the reading, by the video server, a compressed video source of the key monitoring point from the storage space comprises:

invoking, by a network module of the video server, a network card driver to read the compressed video source of the key monitoring point from the storage space.

7. The method according to claim 1, wherein the writing the corresponding video source into a storage space of the video server after the compression is completed comprises:

writing a compressed corresponding video source into a corresponding storage area of the storage space and setting a reading priority of the corresponding storage area to be high.

8. A monitoring system, comprising a monitoring device, a video server, a management center, and a monitoring center, wherein the monitoring center is configured to configure a key monitoring point and send configuration information of the key monitoring point to the video server through the management center; and the video server is configured to receive the configuration information of the key monitoring point, select a corresponding video source according to the configuration information of the key monitoring point, transfer the corresponding video source from a video compression module to a baseboard management controller (BMC) for compression, and write the corresponding video source into a storage space of the video server after the compression is completed;

wherein the monitoring center is further configured to configure whether to enable a key monitoring point compression function of the BMC;

wherein, in response to enabling the key monitoring point compression function of the BMC, the BMC is configured to switch a video compression function of the BMC from a function of compressing an operating system interface to a function of compressing a key monitoring point video without affecting other functions of the BMC;

wherein, in response to not enabling the key monitoring point compression function of the BMC, the BMC is configured to perform a function of compressing the operating system interface on the BMC for a remote client to monitor and view a running state of a local server; and wherein the video server is further configured to, prior to compressing the corresponding video source of the key monitoring point:

determine whether the BMC executes a request for viewing the operating system interface sent by the remote client;

in response to the BMC executing the request, after the BMC completes the request and returns video information corresponding to the request to the remote client, enable the BMC to compress the corresponding video source of the key monitoring point; and in response to the BMC not executing the request, enable the BMC to compress the corresponding video source of the key monitoring point directly.

9. A computer device, comprising a memory and one or more processors, the memory having stored therein computer-readable instructions, and the computer-readable instructions, when executed by the one or more processors, causing the one or more processors to perform operations comprising:

configuring, by a monitoring center, a key monitoring point and sending configuration information of the key monitoring point to a video server through a management center; and receiving, by the video server, the configuration information of the key monitoring point, selecting a corresponding video source according to the configuration information of the key monitoring point, transferring the corresponding video source from a video compression module to a baseboard management controller (BMC) for compression, and writing the corresponding video source into a storage space of the video server after the compression is completed;

configuring, by the monitoring center, whether to enable a key monitoring point compression function of the BMC, in response to enabling the key monitoring point compression function of the BMC, switching a video compression function of the BMC from a function of compressing an operating system interface to a function of compressing a key monitoring point video without affecting other functions of the BMC; and in response to not enabling the key monitoring point compression function of the BMC, performing a function of compressing the operating system interface on the BMC for a remote client to monitor and view a running state of a local server;

wherein before compressing the corresponding video source of the key monitoring point, causing the one or more processors to perform operations comprising:

determining whether the BMC executes a request for viewing the operating system interface sent by the remote client;

in response to the BMC executing the request, after the BMC completes the request and returns video information corresponding to the request to the remote client, enabling the BMC to compress the corresponding video source of the key monitoring point; and in response to the BMC not executing the request, enabling the BMC to compress the corresponding video source of the key monitoring point directly.

10. One or more non-transitory computer-readable storage media storing computer-readable instructions, wherein the computer-readable instructions, when executed by one or more processors, cause the one or more processors to perform the method according to claim 1.

11. The method according to claim 1, wherein the configuring, by the monitoring center, a key monitoring point comprises:

configuring one or more monitoring devices of a risk area of a factory building as the key monitoring point.

12. The method according to claim 1, wherein the configuring, by the monitoring center, a key monitoring point comprises:

in response to end-user needs, configuring one or more monitoring devices corresponding to an area that an end-user wants to view as the key monitoring point.

13. The method according to claim 2, wherein the plurality of monitoring devices comprise one or more analog cameras or one or more digital cameras.

14. The method according to claim 6, wherein the network module comprises a network card.

15. The computer device according to claim 9, wherein when executed by the one or more processors, causing the one or more processors to perform operations further comprising:

acquiring, by the monitoring center, a plurality of monitoring devices connected to a monitoring system and setting a serial number for each of the plurality of monitoring devices; and acquiring a serial number of a corresponding monitoring device of the key monitoring point and sending the serial number of the corresponding monitoring device to the video server through the management center.

16. The computer device according to claim 15, wherein when executed by the one or more processors, causing the one or more processors to perform operations further comprising:

acquiring the serial number of the corresponding monitoring device from the configuration information of the key monitoring point; and selecting the corresponding video source according to the serial number of the corresponding monitoring device.

17. The computer device according to claim 9, wherein when executed by the one or more processors, causing the one or more processors to perform operations further comprising:

in response to enabling the key monitoring point compression function of the BMC, sending corresponding BMC configuration information to the video server through the management center; and receiving, by the video server, the corresponding BMC configuration information and configuring the BMC according to the corresponding BMC configuration information to enable the BMC to compress the corresponding-a video source of the key monitoring point.

* * * * *